United States Patent
Beluch et al.

(10) Patent No.: US 12,236,672 B2
(45) Date of Patent: Feb. 25, 2025

(54) PROCESSING OF LEARNING DATA SETS INCLUDING NOISY LABELS FOR CLASSIFIERS

(71) Applicant: Robert Bosch GmbH, Stuttgart (DE)

(72) Inventors: William Harris Beluch, Stuttgart (DE); Jan Mathias Koehler, Stuttgart (DE); Maximilian Autenrieth, Eislingen/Fils (DE)

(73) Assignee: ROBERT BOSCH GMBH, Stuttgart (DE)

( * ) Notice: Subject to any disclaimer, the term of this patent is extended or adjusted under 35 U.S.C. 154(b) by 986 days.

(21) Appl. No.: 17/233,410

(22) Filed: Apr. 16, 2021

(65) Prior Publication Data

US 2021/0342650 A1 Nov. 4, 2021

(30) Foreign Application Priority Data

Apr. 29, 2020 (DE) .................. 102020205542.4

(51) Int. Cl.
*G06N 3/08* (2023.01)
*G06F 18/21* (2023.01)
(Continued)

(52) U.S. Cl.
CPC ........ *G06V 10/774* (2022.01); *G06F 18/2148* (2023.01); *G06F 18/2193* (2023.01);
(Continued)

(58) Field of Classification Search
CPC .. G06V 10/774; G06V 10/82; G06F 18/2148; G06F 18/2193; G06F 18/241;
(Continued)

(56) References Cited

U.S. PATENT DOCUMENTS

2018/0300632 A1* 10/2018 Katoh .................. G06F 18/23
2020/0285980 A1*  9/2020 Sharad ................ G06N 20/20
(Continued)

FOREIGN PATENT DOCUMENTS

DE        102017219269 A1    5/2019

OTHER PUBLICATIONS

Jan M.Köhler et al., "Uncertainty Based Detection and Relabeling of Noisy Image Labels," Proceedings of the IEEE/CVF Conference on Computer Vision and Pattern Recognition (CVPR) Workshops, 2019, pp. 1-5.

*Primary Examiner* — Kc Chen
(74) *Attorney, Agent, or Firm* — NORTON ROSE FULBRIGHT US LLP; Gerard A. Messina (57) ABSTRACT

A method for processing of learning data sets for a classifier. The method includes: processing learning input variable values of at least one learning data set multiple times in a non-congruent manner by one or multiple classifier(s) trained up to an epoch $E_2$ so that they are mapped to different output variable values; ascertaining a measure for the uncertainty of these output variable values from the deviations of these output variable values; in response to the uncertainty meeting a predefined criterion, ascertaining at least one updated learning output variable value for the learning data set from one or multiple further output variable value(s) to which the classifier or the classifiers map(s) the learning input variable values after a reset to an earlier training level with epoch $E_1 < E_2$.

14 Claims, 6 Drawing Sheets

(51) Int. Cl.
    *G06F 18/214*     (2023.01)
    *G06F 18/241*     (2023.01)
    *G06V 10/774*     (2022.01)
    *G06V 10/82*     (2022.01)

(52) U.S. Cl.
    CPC .............. *G06F 18/241* (2023.01); *G06N 3/08* (2013.01); *G06V 10/82* (2022.01)

(58) Field of Classification Search
    CPC ......... G06F 18/214; G06F 18/24; G06N 3/08; G06N 3/045; G06N 3/047; G06N 3/048; G06N 7/01; G06N 3/082
    See application file for complete search history.

(56) References Cited

U.S. PATENT DOCUMENTS

| | | | |
|---|---|---|---|
| 2021/0233099 A1* | 7/2021 | Manamohan | G06Q 20/3827 |
| 2022/0116764 A1* | 4/2022 | Pezeshki | H04W 72/20 |
| 2022/0414464 A1* | 12/2022 | Krishnaswamy | G06N 3/047 |

\* cited by examiner

PROCESSING OF LEARNING DATA SETS INCLUDING NOISY LABELS FOR CLASSIFIERS

CROSS REFERENCE

The present application claims the benefit under 35 U.S.C. § 119 of German Patent Application No. DE 102020205542.4 filed on Apr. 29, 2020, which is expressly incorporated herein by reference in its entirety.

FIELD

The present invention relates to the processing of training data which are required for training classifiers, for example for recognizing objects in vehicle surroundings.

BACKGROUND INFORMATION

The driving of a vehicle in road traffic by a human driver is generally trained in that a student driver, within the scope of his or her training, is repeatedly confronted with a certain canon of situations. The student driver has to react to each of these situations and, through comments or even an intervention by the driving instructor, receives feedback as to whether his or her reaction was right or wrong. This training using a finite number of situations is to empower the student driver to also cope with unknown situations when independently driving the vehicle.

To allow vehicles to participate in road traffic in an entirely or semi-automated manner, it is sought to control these with the aid of very similarly trainable modules. These modules receive sensor data from the vehicle surroundings as input variables, for example, and ascertain a classification of objects in the surroundings of the vehicle to arrive at a machine processable representation of the traffic situation.

A sufficient number of learning data sets is required for this training, which each encompasses learning input variable values and associated learning output variable values. For example, the learning input variable values may encompass images, and may be "labeled" with the information as to which objects are included in the images as learning output variable values. The "labeling" typically requires human work and is therefore expensive. German Patent Application No. DE 10 2017 219 269 A1 describes a method with the aid of which those learning data sets may be identified whose "labeling" promises the greatest gain of accuracy during the classification.

SUMMARY

Within the scope of the present invention, a method for processing of learning data sets for a classifier is provided. In accordance with an example embodiment of the present invention, the method is based on the assumption that a number of learning data sets is already present. The learning data sets encompass learning input variable values and associated learning output variable values to which the classifier is to nominally map the learning input variable values. The learning input variable values encompass measured data which were obtained by a physical measuring process, and/or by a partial or complete simulation of such a measuring process, and/or by a partial or complete simulation of a technical system observable with the aid of such a measuring process. As a result of the training using the learning data sets, the classifier is to be enabled to also map input variable values which were not part of the training to applicable output variable values within the meaning of the particular application.

For example, the measured data may represent camera images, thermal images, radar data, LIDAR data or ultrasonic data. The output variable values may represent classes of a predefined classification, which are to be assigned in each case to the measured data. The classes may represent objects or states, for example, which are to be detected.

In the process, the respective terms "input variable value" and "output variable value" are not limited to scalars, but may also encompass vectors and matrices, for example.

In accordance with an example embodiment of the present invention, within the scope of the method, learning input variable values of at least one learning data set are processed multiple times in a non-congruent manner by one or multiple classifier(s) trained up to an epoch $E_2$ so that they are mapped to different output variable values. In the process, the term "epoch" shall be understood within the meaning of the technical language on trainable classifiers as a section of the training in which the entire available number of learning data sets is processed by the particular classifier, and the classifier is adapted based on the comparison of the obtained output variable values to the particular learning output variable values.

As is described in greater detail hereafter, multiple processing of one and the same learning input variable value in a non-congruent manner may be implemented for different output variable values, for example, by using a different classifier for each processing. As an alternative or in combination therewith, the processing process of one and the same classifier may, for example, be modified during each use, for example using a stochastic dropout.

In accordance with an example embodiment of the present invention, a measure for the uncertainty of these output variable values is ascertained from the deviations of the obtained output variable values from one another. In response to the uncertainty meeting a predefined criterion, at least one updated learning output variable value is ascertained for the learning data set from one or multiple further output variable value(s) to which the classifier or classifiers map(s) the learning input variable values after a reset to an earlier training level with epoch $E_1 < E_2$. For example, the criterion may, in particular, encompass that the uncertainty exceeds a predefined threshold value.

It was found that an updated learning output variable value obtained in this way is in general more accurate, with respect to the particular application, than an updated learning output variable value which is ascertained based on the training level with epoch $E_2$. The cause of this is that the training of the classifier is in general optimized to the effect that the learning input variable values are, on average, mapped as precisely as possible to the associated learning output variable values. When some of these learning output variable values are noisy or incorrect, contradictions arise in the process. For example, one and the same object cannot simultaneously be a vehicle and a farm animal. The optimization searches for a compromise solution for contradictions of this kind. In the process, a solution which is still reasonably accurate during a first epoch $E_1$ may be "disimproved" during further training, and even though a good compromise may arise during epoch $E_2$ within the meaning of the cost or loss function used for the optimization, it may not be usable as an updated learning output variable value.

When a classifier is trained, the parameters which characterize its behavior and which are optimized during the training are typically stored, at least at the end of each epoch.

These parameters may, for example, encompass the weights of a neural network in the classifier. In this way, the reset to the earlier training level with epoch $E_1$ may be achieved quickly by reading in the stored parameters.

In one particularly advantageous embodiment of the present invention, the learning output variable values of multiple modifications of a classifier are mapped to different output variable values. These modifications differ from one another to such an extent that they are not congruently merged into one another with advancing training. Thus, they form an ensemble. The different output variable values ascertained within this ensemble allow a statistically well-motivated conclusion to be drawn of the uncertainty of the output variable values. At the same time, the further output variable values obtained after the classifiers of the ensemble have been reset to epoch $E_1$ may be computed into an updated learning output variable value in an understandable and statistically well-motivated manner.

In one further particularly advantageous embodiment of the present invention, for example, a separate uncertainty may be ascertained for the output variable value ascertained by each modification of the classifier. Only an established number of those modifications which generated the output variable values having the lowest uncertainties may then contribute to the ascertainment of the updated learning output variable value. In other words, from a set of N modifications, only the top K, where $1<K<N$, modifications have a say, whose suggestions for the output variable value have the highest probability of being accurate.

In this way, the uncertainties of the suggestions of the ensemble members are thus effectively weighted among one another. The fact that the updated learning output variable value ascertained in this way is probably more accurate for the application of the classifier than an individual suggestion of an ensemble member becomes directly apparent when, for comparison, considering the established process for establishing the official values of physical natural constants. The values ascertained by the Committee on Data for Science and Technology (CODAT) are optimal estimates based on a plurality of measurements of different laboratories, which are weighted among one another with the reciprocal of the squares of their respective standard uncertainties. Experiments by the inventors also confirmed that the consideration of the top K modifications, instead of only the top 1 modification, supplies a considerably more accurate updated learning output variable value, especially in the case of classification problems, with a larger number of available classes (for example the ImageNet data set including 1000 classes). When the learning data sets for the ultimately used classifier are enhanced with such updated values, this classifier, during tests using test or validation data sets, supplies output variable values which agree better with the particular setpoint output variable values.

In one further particularly advantageous embodiment of the present invention, a respective updated learning output variable value is established for each modification of the classifier. In particular, the uncertainties of the output variable values supplied by the different modifications among one another may be typified in these different learning output variable values.

This means that no longer only a single classifier, but an ensemble of modifications is trained during the training of the classifier ultimately to be used for the classification, each modification then being trained using learning output variables, which are partially identical for all these modifications, and partially were individually established for each modification. Accordingly, the input variable values of all trained modifications of the ensemble are also supplied during the later use of the classifier, and the output variable values supplied by these modifications are computed with one another.

In very general terms, the learning input variable values may be processed multiple times in a non-congruent manner by the classifier or classifiers to output variable values at the earlier training level with epoch $E_1$. It is then possible to ascertain a summarizing statistic, such as for example a mean value or a median, via these output variable values. Supplying the learning input variable values to different modifications is only one possible way for ensuring multiple non-congruent processing. As an alternative, or also in combination therewith, this processing itself may also be executed probabilistically. In the classifier or the modification, for example, weights or other parameters which characterize the behavior of the classifier or of the modification may be drawn anew from a distribution during every use.

The summarizing statistic may, for example, be directly established as an updated learning output variable value. However, it is also possible to assign an updated learning output variable value to each modification of the classifier, for example, which assigns exactly one of the available classes of the predefined classification to the learning input variable values. The learning output variable values may then be distributed to the modifications in such a way that the ensemble average reproduces the summarizing statistic via the modifications.

In a simple example, the predefined classification includes five classes from 0 through 4, and five modifications of the classifier to be trained are used to process the same learning input variable values multiple times in a non-congruent manner to output variable values. These output variable values are vectors, each including five elements which correspond to the five available classes. At the training level with epoch $E_1$ for a particular learning input variable value, the mean value of the output variable values over the five ensemble members shall now be the vector [0.6, 0.2, 0.2, 0, 0], for example. The vector [1, 0, 0, 0, 0] is assigned as a learning output variable value to the first three modifications. The vector [0, 1, 0, 0, 0] is assigned as a learning output variable value to the fourth modification. The vector [0, 0, 1, 0, 0] is assigned as a learning output variable value to the fifth modification. During processing of the learning input variable value by the ensemble made up of the five modifications, it is now equally probable for each of the five modifications that exactly this modification comes into play. When, after completion of the training, one of the three first modifications comes into play, the learning input variable value is mapped to vector [1, 0, 0, 0, 0]. The probability for this is $3/5=0.6$. When the fourth modification comes into play, the learning input variable value is mapped to vector [0, 1, 0, 0, 0]. The probability for this is $1/5=0.2$. When the fifth modification comes into play, the learning input variable value is mapped to vector [0, 0, 1, 0, 0]. The probability for this is $1/5=0.2$. In this way, the ensemble average for the output variable value to which the aforementioned learning input variable value is mapped is [0.6, 0.2, 0.2, 0, 0]. This ensemble average is thus carried forward into further epochs by setting the aforementioned updated learning output variable values [1, 0, 0, 0, 0], [0, 1, 0, 0, 0] and [0, 0, 1, 0, 0].

With regard to the understanding of this procedure, it is helpful to consider parallels to the method of multiple imputation in mathematical statistics. During multiple imputation, multiple estimated values are ascertained for each missing value in a statistical collection, and these estimated values are aggregated into one estimated value, for example by averaging.

An important advantage of this procedure is that the possibility that the non-dominant class in the ensemble average of the output variable values is actually the accurate class for updating the learning output variable value is not precluded at an early stage. In the above-described example, it is thus not inferred at an early stage from the value 0.6 in the ensemble average [0.6, 0.2, 0.2, 0, 0] of the output variable values that the accurate class for updating the learning output variable class can only be class 0.

In one further particularly advantageous embodiment of the present invention, the learning input variable values are processed multiple times by at least one classifier. In the process, one or multiple neuron(s) and/or other processing unit(s) of the classifier is/are deactivated in a random-controlled manner. For example, the processing may be rendered probabilistic by a Monte Carlo dropout.

As explained above, output variable values which a classifier supplies for learning input variable values with a noisy or incorrect learning output variable value are possibly more accurate during an earlier epoch $E_1$ than during a later epoch $E_2$, during which the aforementioned compromise for minimizing the cost or loss function may possibly already have been made. In one further particularly advantageous embodiment, an accuracy with which the classifier maps, or the classifiers map, test or validation input variable values to associated test or validation output variable values is thus ascertained as a function of the training level of the classifier or classifiers. An epoch in which this accuracy assumes a maximum is selected as epoch $E_1$ for the ascertainment of the updated learning output variable value.

By not only taking the uncertainty of the output variable values supplied by the classifier or classifiers into consideration during the recognition of noisy or incorrect learning output variable values, but also during the ascertainment of the updated learning output variable value, the probability is increased that the updated learning output variable values in the context of the application of the classifier are more accurate than the original learning output variable values. When, for a learning input variable value (for example, an image), an inaccurate new learning output variable value (for example an incorrect class to which the image actually does not belong) is repeatedly established, the learning capability of the network overall may suffer.

As explained above, the classifier or the classifiers may be further trained, using the learning data set which was enhanced with the at least one updated learning output variable value. The method for processing the learning data sets may thus be integrated into the training of the classifier.

It is also possible, for example, to alternate between training phases and processing of the learning data sets. For example, initially a training may be carried out using the original learning data sets. Thereafter, the learning data sets may be processed as described above. The training may then be repeated using these new learning data sets. This cycle may be repeated until an arbitrary abort criterion is met.

The abort criterion may, in particular, encompass, for example, that the uncertainty of the output variable values ascertained from the learning input variable values exceeds a predefined threshold value in no more than a predefined percentage of the learning data sets.

As an alternative or in combination therewith, the abort criterion for this purpose may, for example, encompass that the classifier, during a test using test or validation data sets, maps the respective test input variable values, or validation input variable values, at least with a predefined accuracy to the respective associated test output variable values, or validation output variable values. The test output variable values, or the validation output variable values, are thus to be regarded as setpoint output variable values during such a test.

By simultaneously also allowing multiple classes for the updated learning output variable value, be it by assigning different classes to different modifications or by forming a single learning output variable value which includes multiple classes, overall the tendency is increased to change the learning output variable values in the learning data sets at all. In the process, there is generally always the risk that the updated learning output variable value is not entirely accurate in the context of the application of the classifier. However, in particular, with predefined classifications including a plurality of classes, the probability is high that the updated learning output variable value is at least considerably more accurate than the original learning output variable value.

A deeper cause for this is that predefined classifications including a plurality of classes frequently include semantic hierarchies of classes. For example, in the ImageNet classification with its 1000 classes, there are many classes which relate to different breeds of dogs, and many classes which relate to different types of plants. If now, for example, a German shepherd, which was previously labeled with the incorrect learning output variable value "cactus," is categorized in the class "husky," this is still not yet completely correct, but the German shepherd is at least already recognized as a dog. In that the updated learning output variable value is also able to indicate multiple classes, it is furthermore also easily possible that the correct class "German shepherd" receives a contribution different from zero. During further continuation of the training, in particular, when alternating between training phases and processing of the learning data sets, this contribution may still increase.

The described method for processing of learning data sets decreases the number of those data sets whose learning output variable values, in the context of the application of the classifier, do not match the respective learning input variable values. This has a particularly advantageous effect when training classifiers which are particularly sensitive to such incorrect assignments in the learning data sets.

The present invention thus also relates to a method for training a classifier based on learning data sets. The learning input data included in each case in these learning data sets encompass measured data which were obtained by a physical measuring process, and/or by a partial or complete simulation of such a measuring process, and/or by a partial or complete simulation of a technical system observable with the aid of such a measuring process. In addition, the learning data sets in each case include learning output variable values to which the classifier is to nominally map the learning input variable values.

In accordance with an example embodiment of the present invention, within the scope of the method, initially a preclassifier is trained to distinguish learning data sets whose respective learning input variable values are assigned correct learning output variable values from learning data sets whose respective learning input variable values are assigned noisy or incorrect learning output variable values. This preclassifier may have a comparatively simple design and, for example, may divide the assignment of the learning output variable values to the learning input variable values into one of two or more quality classes, depending on how correct this assignment is in the context of the application of the classifier.

The learning data sets are classified using the preclassifier. Learning data sets in which the assignment of the learning output variable values to the learning input variable values is accurate, according to the judgment of the preclassifier, are added to a set of preferred learning data sets.

At least one learning data set whose learning output variable values, according to the judgment of the preclassifier, are noisy or incorrect is provided with at least one updated learning output variable value using the above-described method. The learning data set thus processed is added to the set of preferred learning data sets.

The actual classifier is finally trained using the learning data sets in the set of preferred data sets. This classifier may, in particular, have a comparatively complex architecture, which, even though it promises a higher accuracy, is sensitive to noisy or incorrect learning output variable values.

In this connection, the prefiltering by the preclassifier has the effect that noisy or incorrect learning output variable values are excluded from the training of the actual classifier, and cannot impair the result of the training. At the same time, as a result of processing the noisy or incorrect learning output variable values using the above-described method, not too many labeled learning data sets are completely lost as a result of the exclusion of the noisy or incorrect learning output variable values. In this way, a portion of these learning data sets may still be "saved." As explained above, learning data sets are a scarce resource since the labeling typically requires human work.

In one particularly advantageous embodiment of the present invention, the learning data set including the updated learning output variable value is again supplied to the preclassifier. This learning data set is only added to the set of preferred learning data sets when it is classified by the preclassifier as a learning data set whose learning input variable values are assigned correct learning output variable values. The success of the "relabeling" is thus specifically checked before the result is utilized for the further training.

In the broadest sense, the combination of the prefiltering with the preclassifier and the training of the actual classifier may be regarded as a kind of "student-teacher method." The analogy is that the preclassifier ("teacher") is fed all learning data sets, while the actual classifier ("student") is only trained using a portion of the learning data sets.

As explained above, the above-described processing of the learning data sets ultimately achieves the success that a classifier, which is trained taking the processed learning data sets into consideration, classifies measured data more accurately in the context of the particular application of the classifier. Thus, if technical systems are activated based on the output variable values supplied by the classifier, the probability is increased that the action, triggered thereby, of the instantaneous situation in which the technical system finds itself is appropriate. This instantaneous situation is typified in the input variable values of the classifier.

The present invention thus also relates to a method which completes the event chain from the training to the activation of technical systems.

In accordance with an example embodiment of the present invention, in this method, initially a classifier is trained based on learning data sets processed using the initially described method and/or using the training method described thereafter.

The classifier is then operated in that input variable values are supplied to it. These input variable values encompass measured data which were obtained by a physical measuring process, and/or by a partial or complete simulation of such a measuring process, and/or by a partial or complete simulation of a technical system observable with the aid of such a measuring process. For example, photorealistic images of situations may be generated with the aid of computational tracing of rays of light ("ray tracing") or also using neural generator networks (for example, generative adversarial networks, GAN). In the process, it is also possible, for example, to introduce findings from the simulation of a technical system, such as for example positions of certain objects, as secondary conditions. The generator network may be trained to deliberately generate images which satisfy these secondary conditions (for example, conditional GAN, cGAN).

An activation signal is formed as a function of the output variable values supplied by the classifier. A vehicle and/or a system for the quality control of series-manufactured products, and/or a system for medical imaging is/are activated using this activation signal.

The methods may, in particular, be entirely or partially computer-implemented. The present invention thus also relates to a computer program including machine-readable instructions which, when they are executed on one or multiple computer(s), prompt the computer(s) to carry out one of the described methods. Within this meaning, control units for vehicles and embedded systems for technical devices, which are also able to execute machine-readable instructions, are to be regarded as computers.

The present invention also relates to a machine-readable data carrier and/or to a download product including the computer program. A download product is a digital product transmittable via a data network, i.e., downloadable by a user of the data network, which may be offered for immediate download in an online shop, for example.

Furthermore, a computer may be equipped with the computer program, with the machine-readable data carrier and/or with the download product.

Further measures improving the present invention are shown hereafter in greater detail together with the description of the preferred exemplary embodiments of the present invention based on the figures.

DETAILED DESCRIPTION OF EXAMPLE EMBODIMENTS

DETAILED DESCRIPTION OF EXAMPLE EMBODIMENTS

Figure 1:
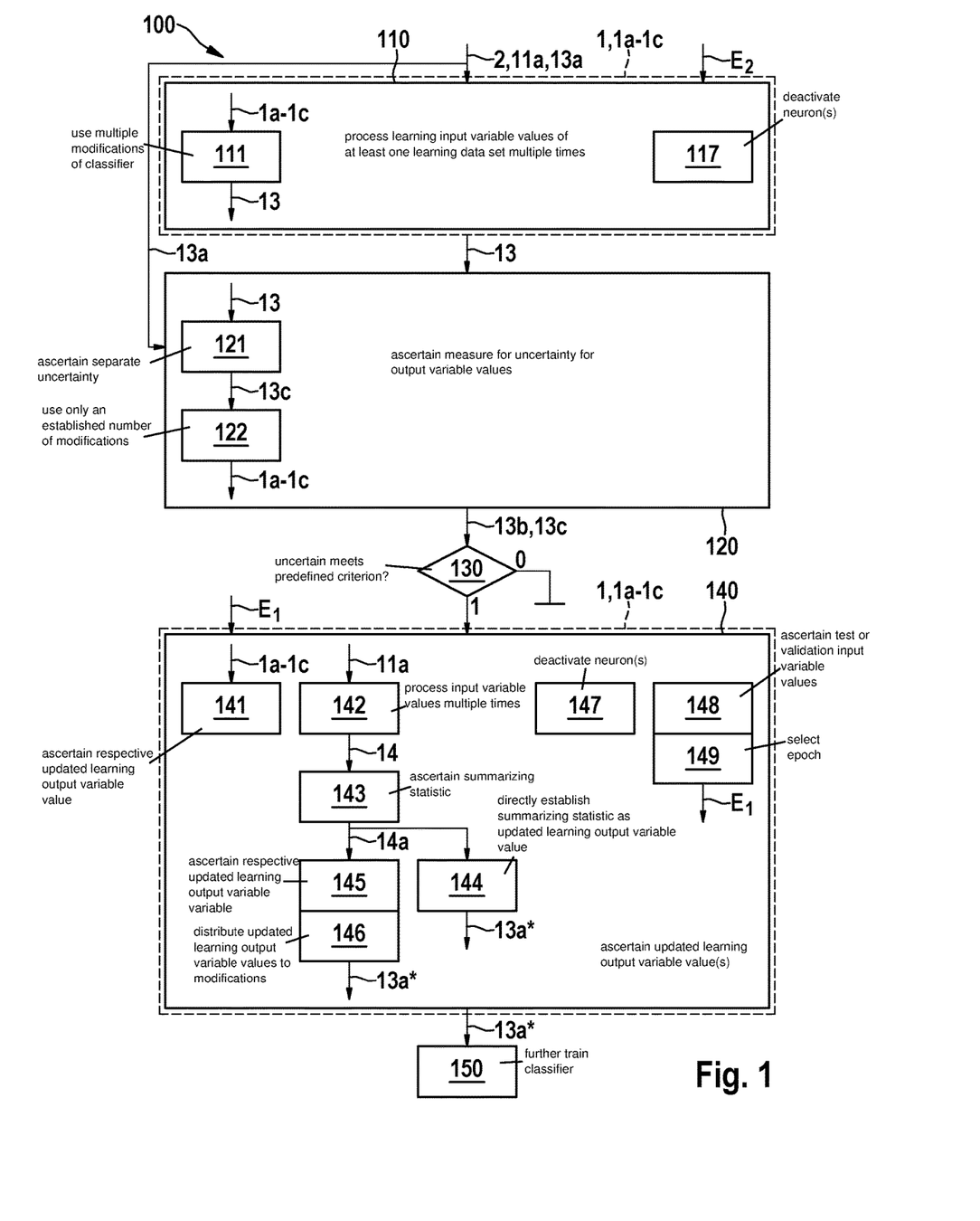
FIG. 1 shows one exemplary embodiment of method 100 for processing learning data sets 2, in accordance with the present invention.

FIG. 1 shows a schematic flowchart of one exemplary embodiment of method 100 for processing learning data sets 2 for a classifier 1. Learning data sets 2 encompass learning input variable values 11a and associated learning output variable values 13a to which the classifier is to nominally map learning input variable values 11a. Learning input variable values 11a encompass measured data which were obtained by a physical measuring process, and/or by a partial or complete simulation of such a measuring process, and/or by a partial or complete simulation of a technical system observable with the aid of such a measuring process.

In step 110 of method 100, learning input variable values 11a of at least one learning data set 2 are processed multiple times in a non-congruent manner by one or multiple classifier(s) 1, 1a through 1c trained up to an epoch $E_2$. In this way, multiple different output variable values 13 arise for the same learning input variable values 11a. For this purpose, for example according to block 111, multiple modifications 1a through 1c of a classifier may be used, which differ from one another to such an extent that they are not congruently merged into one another with advancing training.

In step 120, a measure for uncertainty 13b of these output variable values 13 is ascertained from the deviations of output variable values 13. In response to this uncertainty 13b meeting a predefined criterion 130 (truth value 1), at least one updated learning output variable value 13a* is ascertained for learning data set 2 from one or multiple further output variable value(s) 14 to which classifier(s) 1, 1a through 1c map learning input variable values 11a after reset to an earlier training level with epoch $E_1 < E_2$.

In step 150, classifier(s) 1, 1a through 1c may be further trained, using learning the data set 2 including the at least one updated learning output variable value 13a*.

In the process, in particular, for example according to block 121, a separate uncertainty 13c may be ascertained for output variable value 13 ascertained by each modification 1a through 1c. According to block 122, it is then possible that only an established number of those modifications 1a through 1c which generated the output variable values 13 having the lowest uncertainties 13c, contribute to the ascertainment of updated learning output variable value 13a*. This means that the top K output variable values 13 having the lowest uncertainties 13c are used for forming the updated learning output variable value 13a*. For checking criterion 130, the individual uncertainties 13c may be allocated into a single uncertainty 13b, for example. However, criterion 130 may also be directly expressed in the individual uncertainties 13c, for example.

According to block 141, in particular, a respective updated learning output variable value 13a* may be ascertained, for example for each modification 1a through 1c. Modifications 1a through 1c may then thereafter be trained further independently of one another.

In addition, according to block 142, learning input variable values 11a may be processed multiple times in a non-congruent manner by classifier(s) 1, 1a through 1c to output variable values 14 at the earlier training level with epoch $E_1$. This may be achieved, for example, by using multiple modifications 1a through 1c of the classifiers, but alternatively, or also in combination therewith, by a probabilistic configuration of the processing process itself, for example a Monte Carlo dropout or drawing of parameters of classifier 1, 1a through 1c from a distribution. According to block 143, a summarizing statistic 14a may then be ascertained via these output variable values 14.

This summarizing statistic 14a may then, for example according to block 144, be directly established as updated learning output variable value 13a*.

However, for example according to block 145, it is also possible to ascertain a respective updated learning output variable value 13a* for each modification 1a through 1c, which assigns exactly one class to learning input variable values 11a. According to block 146, these updated learning output variable values 13a* may be distributed to modifications 1a through 1c in such a way that the ensemble average reproduces summarizing statistic 14a via modifications 1a through 1c.

Generally speaking, according to blocks 117 and 147, in each case one or multiple neuron(s) and/or other processing units of classifier 1, 1a through 1c may be deactivated (Monte Carlo dropout) in a random-controlled manner during the multiple processing of learning input variable values 11a by at least one classifier 1, 1a through 1c.

To find the optimal epoch $E_1$ for the ascertainment of updated learning output variable value 13a*, according to block 148 an accuracy with which classifier(s) 1, 1a through 1c map(s) test or validation input variable values to associated test or validation output variable values may be ascertained as a function of the training level of classifier(s) 1, 1a through 1c. An epoch in which this accuracy assumes a maximum may then selected as epoch $E_1$ for the ascertainment of updated learning output variable value 13a*.

Figure 2:
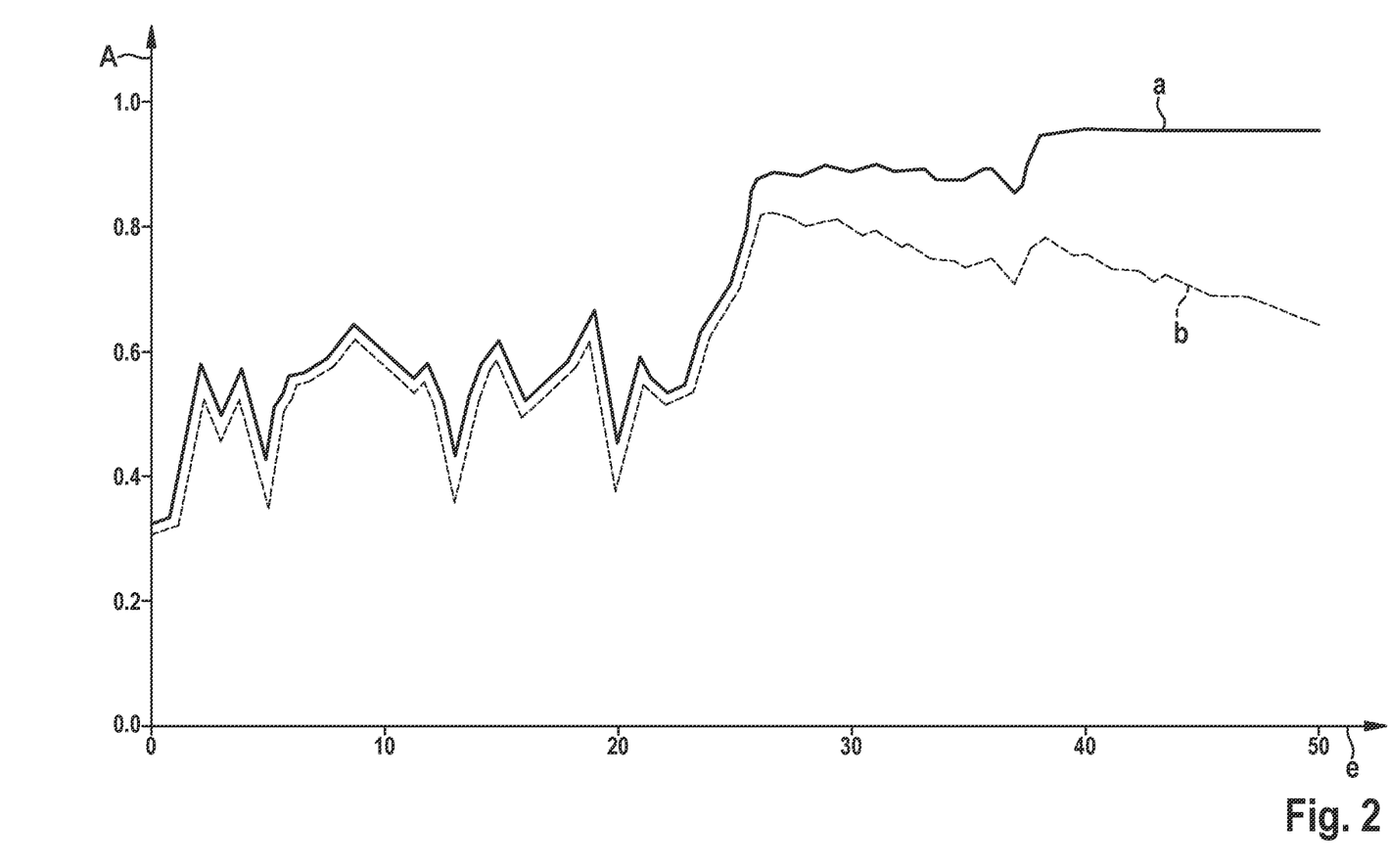
FIG. 2 shows the dependence of classification accuracy A on epoch count e of a training using non-noisy (curve a) and noisy (curve b) labels.

The motivation behind this method for the ascertainment of epoch 1 is illustrated in FIG. 2. Here, classification accuracy A of a classifier 1 ascertained based on test or validation data for images from the ImageNet data set is plotted against epoch number e of the training level of this classifier 1. Curve a was created for the case that all learning output variable values (labels) 13a are correct. Curve b was created for the case that a fraction of 40% of the labels is noisy or incorrect. To ascertain accuracy A, the class considered to be the most probable by classifier 1 (i.e., the class having the maximum Softmax score) was compared in each case to the correct class.

Curve a created for correct labels continuously increases toward the end of the training to a final value, except for smaller corrections. Curve b created for noisy labels, in contrast, has a maximum at epoch number e=25 and an accuracy A of approximately 0.8 (80%), and then decreases again. This yields the previously addressed effect that the optimization within the meaning of the cost or loss function, in the case of conflicting information from the labels, produces compromise solutions which "disimprove" the accuracy A during the further training.

Figure 3:
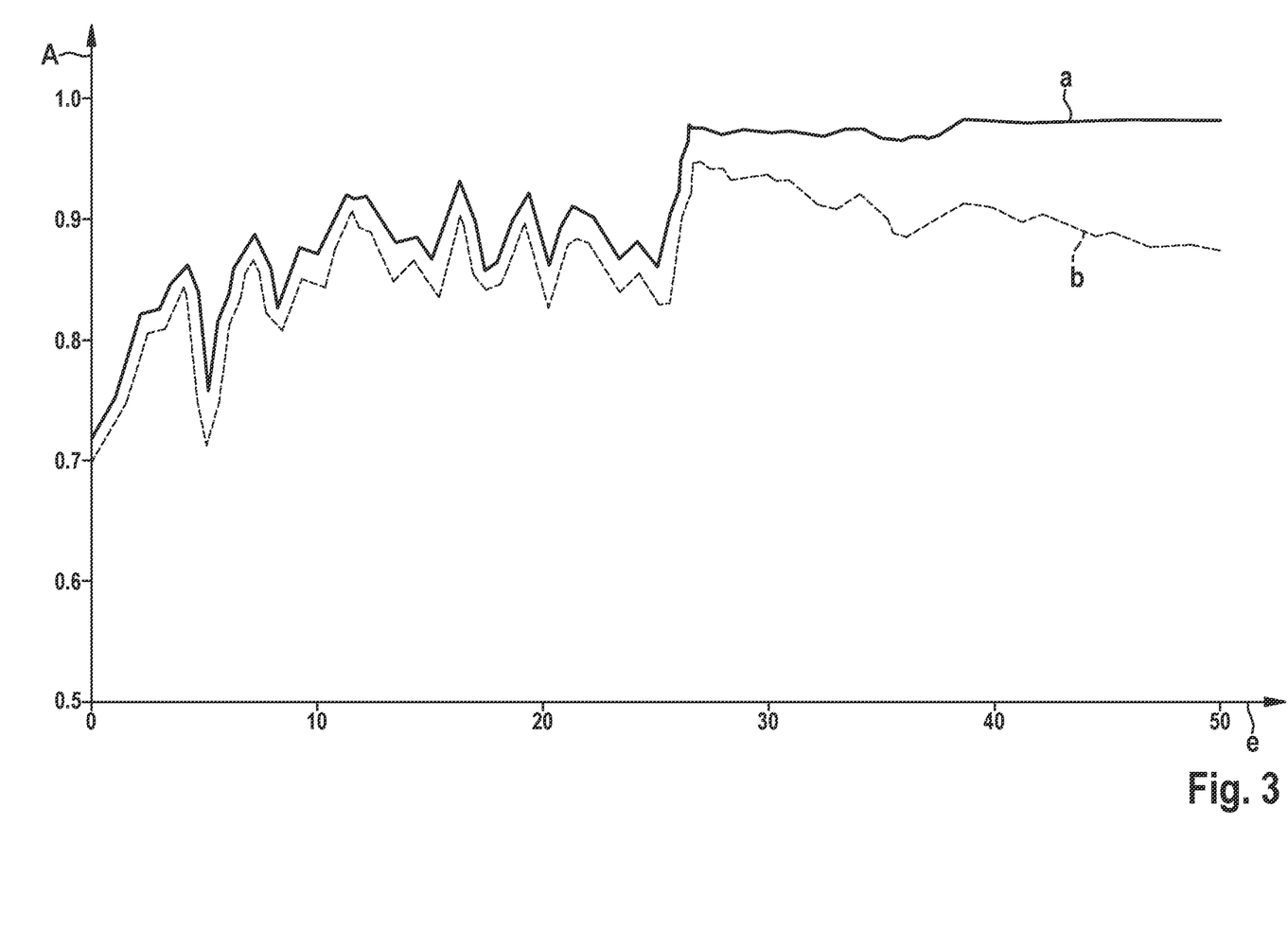
FIG. 3 shows an improvement in classification accuracy A shown in FIG. 2 by taking the top-3 classifiers 1*a* through 1*c* of an ensemble into consideration.

The same trend is also qualitatively yielded in FIG. 3, in which an accuracy A ascertained analogously to FIG. 2 is plotted. In contrast to FIG. 2, accuracy A here, however, was measured based on the extent to which the top 3 of output variables 13, supplied by classifiers 1a through 1c of an ensemble, having the lowest uncertainties 13c indicate the correct class. At approximately 0.95 (95%), quantitatively accuracy A measured at epoch number e=25 is considerably better in the noisy case (curve b) than in FIG. 2. It thus appears to be promising not to ascertain updated learning output variable values 13a* based on the top 1 prediction of an individual classifier 1, 1a through 1c, but based on the top K predictions of multiple ensemble members 1a through 1c.

Figure 4:
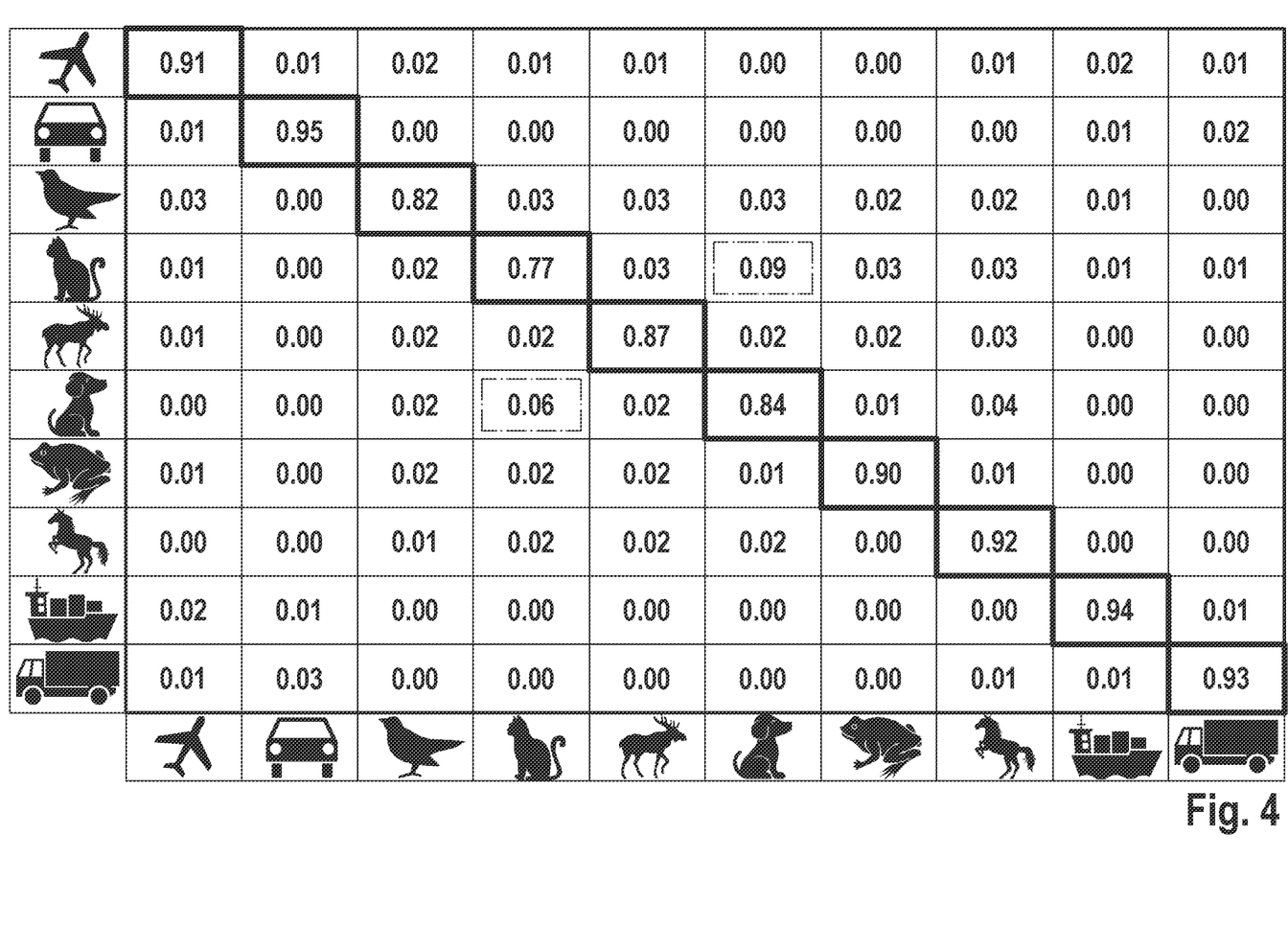
FIG. 4 shows a section of the confusion matrix for images of the ImageNet data set after training including processing of learning data sets 2 by method 100.

FIG. 4 shows a section of a confusion matrix ascertained based on test or validation data. In this confusion matrix, each row indicates the probabilities or confidences with which images of the respective objects shown on the left, next to the line, airplane,
passenger car,
bird, cat,
moose,
dog,
frog,
horse,
ship and
truck were assigned to these ten classes. The diagonal elements of this matrix framed in bold represent correct assignments. The non-diagonal elements represent cases of confusion.

The confusion matrix was formed after a set of learning data sets including originally 40% noisy learning output variable values (labels) 13a had been processed once using method 100 shown in FIG. 1, and after classifier 1 had subsequently been trained further.

It is noticeable in this confusion matrix that the erroneous assignments are primarily concentrated between the classes "dog" and "cat." This is due to the fact that dogs and cats are comparatively similar to one another.

Figure 5:
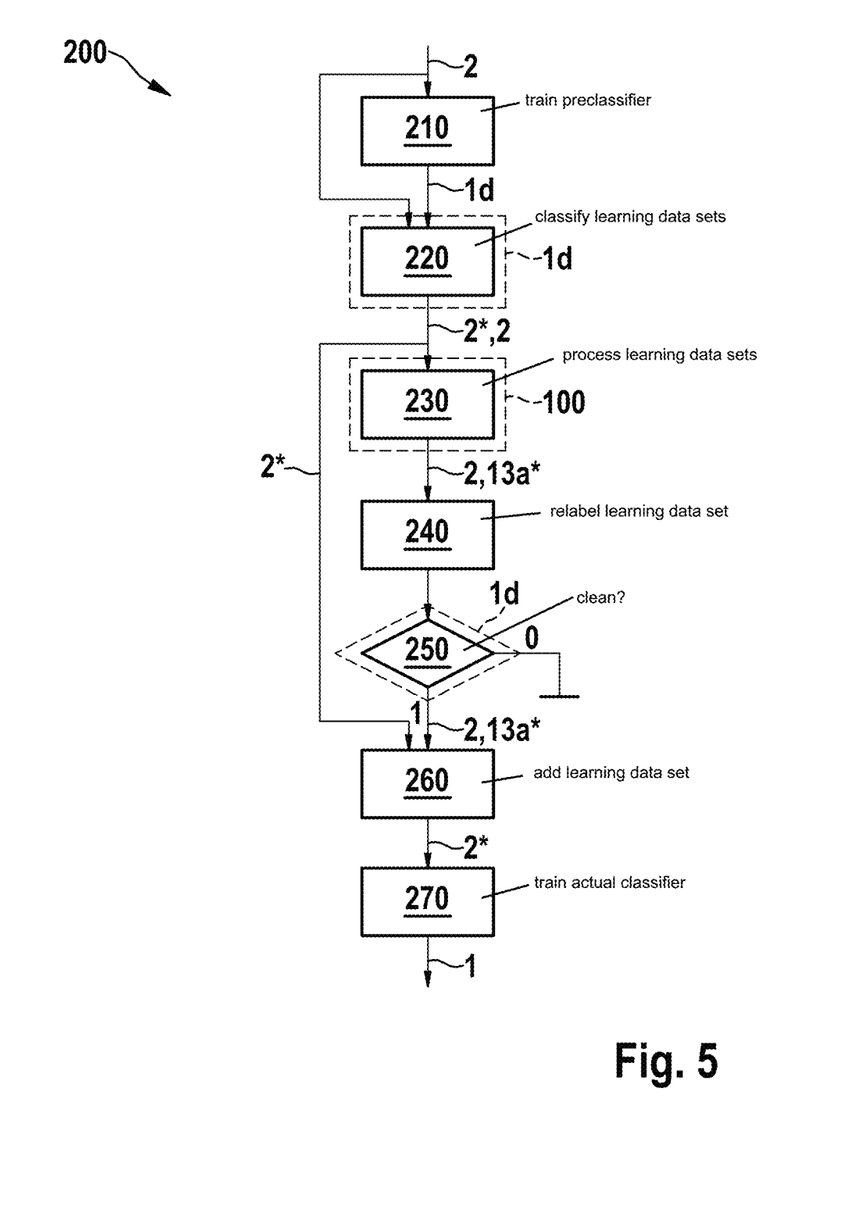
FIG. 5 shows an exemplary embodiment of method 200 for training a classifier 1, in accordance with the present invention.

FIG. 5 shows a schematic flowchart of one exemplary embodiment of method 200 for training a classifier 1 based on given learning data sets 2 including learning input variable values 11a and learning output variable values 13a. Analogously to method 100, learning input variable values 11a encompass measured data.

In step 210, a preclassifier 1d is trained to distinguish learning data sets 2 whose respective learning input variable values 11a are assigned correct learning output variable values 13a (i.e., learning data sets 2 including "clean" labels 13a) from learning data sets 2 whose respective learning input variable values 11a are assigned noisy or incorrect learning output variable values 13a (noisy labels 13a).

Using this trained preclassifier, learning data sets 2 are classified in step 220, and learning data sets 2 including "clean" labels 13a are added to a set 2* of preferred learning data sets 2, for which the actual classifier 1 is to be trained later.

As explained above, several of the original learning data sets 2 are "lost" as a result. Labeled learning data sets 2, however, are a scarce and expensive commodity. In step 230, learning data sets 2 including noisy labels 13a are thus processed using method 100 explained in greater detail in connection with FIG. 1. In the process, at least one learning data set 2 is given an updated learning output variable value 13a*, i.e., it is "relabeled."

This "relabeled" learning data set 2 is supplied to preclassifier 1d again in step 240. In step 250, it is checked whether learning data set 2, after the "relabeling," may now be recognized as learning data set 2 including a "clean" label 13a. If this is the case (truth value 1), this learning data set 2 is added to set 2* of preferred learning data sets 2 in step 260. In step 270, the actual classifier 1, which is to divide arbitrary input variable values 11 by its output variable values 13 into the classes of the predefined classification, is trained using learning data sets 2 included in set 2*.

Figure 6:
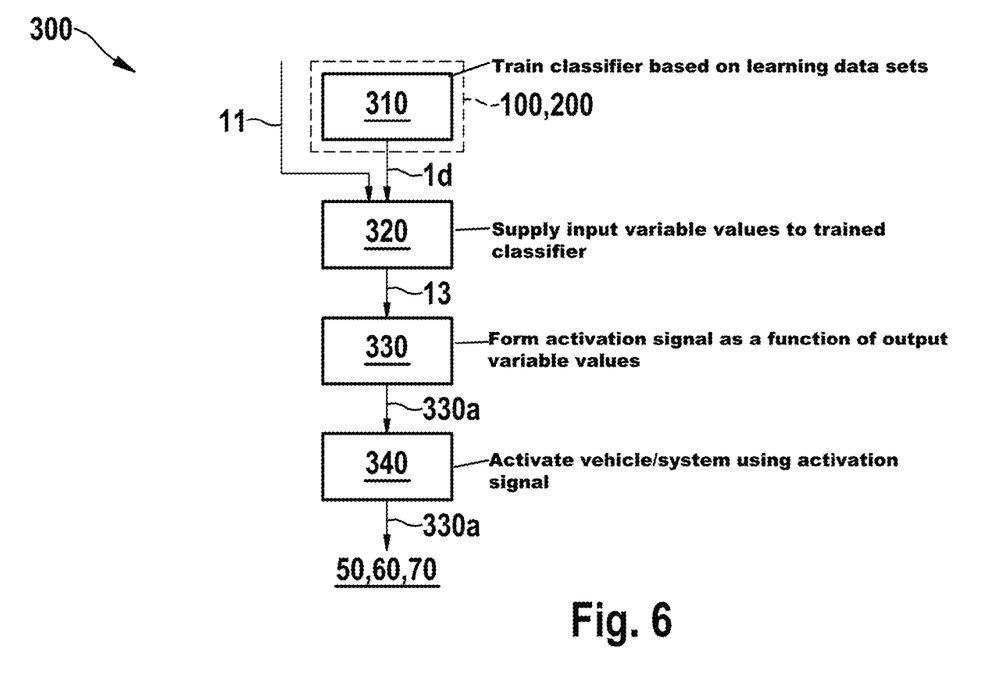
FIG. 6 shows one exemplary embodiment of method 300 with a complete event chain up to the activation of technical systems 50, 60, 70, in accordance with the present invention.

FIG. 6 is a schematic flowchart of one exemplary embodiment of method 300 including the complete event chain.

In step 310, at least one classifier is trained based on learning data sets 2 processed using method 100 and/or using training method 200.

The trained classifier 1 is operated in step 320 in that input variable values 11 are supplied to it. These input variable values 11 encompass measured data.

In step 330, an activation signal 330a is formed as a function of output variable values 13 supplied by classifier 1. Using this activation signal, a vehicle 50 and/or a system 60 for the quality control of series-manufactured products, and/or a system 70 for medical imaging is/are activated.

What is claimed is:

1. A method for processing of learning data sets for a classifier, the learning data sets each encompassing measured data, which were obtained by a physical measuring process, or by a partial or complete simulation of a physical measuring process, or by a partial or complete simulation of a technical system observable using a physical measuring process, as learning input variable values, the learning data sets additionally each encompassing learning output variable values to which the classifier is to map the learning input variable values, the method comprising the following steps:

processing the learning input variable values of at least one of the learning data sets multiple times in a non-congruent manner by the classifier trained up to an epoch E2 so that the learning input variable values are mapped to different output variable values;

ascertaining a measure for an uncertainty of the output variable values from deviations of the output variable values;

in response to the uncertainty meeting a predefined criterion, ascertaining at least one updated learning output variable value for a learning data set of the at least one of the learning data sets from one or multiple further output variable value(s) to which the classifier maps the learning input variable values after a reset to an earlier training level with epoch E1<E2 such that an accuracy of the ascertained at least one updated learning output variable value is greater than the accuracy ascertained based on the training level with epoch E2;

wherein the learning input variable values are mapped by multiple modifications of the classifier, wherein the multiple modifications differ from one another to such an extent that they are not congruently merged into one another with advancing training of the classifier, to different output variable values, and wherein a separate uncertainty is ascertained for each output variable value ascertained by each of the modifications, only an established number of the modifications which generated the output variable values having lowest uncertainties contributing to the ascertainment of the at least one updated learning output variable value.

2. The method as recited in claim 1, wherein a respective updated learning output variable value is ascertained for each of the modifications.

3. The method as recited in claim 1, wherein the learning input variable values are processed multiple times in a non-congruent manner by the classifier to output variable values at the earlier training level with epoch E1, and a summarizing statistic is ascertained using the output variable values.

4. The method as recited in claim 3, wherein a respective updated learning output variable value is ascertained for each of the modifications, and wherein the at least one updated learning output variable value for each of the modifications assigns exactly one class to the learning input variable values, and the at least one updated learning output variable values are distributed to the modifications in such a way that an ensemble average reproduces the summarizing statistic via the modifications.

5. The method as recited in claim 1, wherein summarizing statistic is established as an updated learning output variable value of the at least one updated learning output variable value.

6. The method as recited in claim 1, wherein the learning input variable values are processed multiple times by the classifier, in each case, one or multiple neuron(s) or other processing unit(s) of the classifier is deactivated in a random-controlled manner.

7. The method as recited in claim 1, wherein an accuracy with which the classifier maps test or validation input variable values to associated test or validation output variable values is ascertained as a function of a training level of the classifier, and an epoch in which the accuracy assumes a maximum is selected as the epoch E1 for the ascertainment of the at least one updated learning output variable value.

8. The method as recited in claim 1, wherein the classifier is further trained using the learning data set including the at least one updated learning output variable value.

9. A method for training a classifier based on learning data sets, each of the learning data sets encompassing measured data, which were obtained by a physical measuring process, or by a partial or complete simulation of a physical measuring process, or by a partial or complete simulation of a technical system observable using a physical measuring process, as learning input variable values, each of the learning data sets additionally encompassing learning output variable values to which the classifier is to map the learning input variable values, the method comprising the following steps:
training a preclassifier to distinguish learning data sets whose respective learning input variable values are assigned correct learning output variable values from learning data sets whose respective learning input variable values are assigned noisy or incorrect learning output variable values;
classifying the learning data sets using the trained preclassifier, and adding those of the learning data sets, whose respective learning input variable values are assigned correct learning output variable values, to a set of preferred learning data sets;
providing at least one learning data set of the learning data sets, whose learning input variable values are assigned noisy or incorrect learning output variable values with at least one updated learning output variable value by:
processing the learning input variable values of the at least one learning data set multiple times in a non-congruent manner by the classifier trained up to an epoch E2 so that the learning input variable values are mapped to different output variable values;
ascertaining a measure for an uncertainty of the output variable values from deviations of the output variable values;
in response to the uncertainty meeting a predefined criterion, ascertaining the at least one updated learning output variable value for the at least one learning data set from one or multiple further output variable value(s) to which the classifier maps the learning input variable values after a reset to an earlier training level with epoch E1<E2 such that an accuracy of the ascertained at least one updated learning output variable value is greater than the accuracy ascertained based on the training level with epoch E2;
adding the at least one learning data set with the at least one updated learning output variable value to the set of preferred learning data sets; and
training the classifier using the learning data sets in the set of preferred learning data sets.

10. The method as recited in claim 9, wherein in the providing step, the at least one learning data set of the learning data sets, whose learning input variable values are assigned noisy or incorrect learning output variable values, is provided with the at least one updated learning output variable value by:
wherein the learning input variable values are mapped by multiple modifications of the classifier, wherein the multiple modifications differ from one another to such an extent that they are not congruently merged into one another with advancing training, to different output variable values, and
wherein a separate uncertainty is ascertained for each output variable value ascertained by each of the modifications, only an established number of the modifications which generated the output variable values having lowest uncertainties contributing to the ascertainment of the at least one updated learning output variable value.

11. The method as recited in claim 10, wherein the at least one learning data set including the updated learning output variable value is again supplied to the preclassifier, and the at least one learning data set including the updated learning output variable is only added to the set of preferred learning data sets when it is classified by the preclassifier as a learning data set whose learning input variable values are assigned correct learning output variable values.

12. A method, comprising the following steps:
training at least one classifier based on processed learning data sets, the learning data sets each encompassing measured data, which were obtained by a physical measuring process, or by a partial or complete simulation of a physical measuring process, or by a partial or complete simulation of a technical system observable using a physical measuring process, as learning input variable values, the learning data sets additionally each encompassing learning output variable values to which the classifier is to map the learning input variable values, the learning data sets being processed by:
processing the learning input variable values of at least one of the learning data sets multiple times in a non-congruent manner by the classifier trained up to an epoch E2 so that the learning input variable values are mapped to different output variable values,
ascertaining a measure for an uncertainty of the output variable values from deviations of the output variable values,
in response to the uncertainty meeting a predefined criterion, ascertaining at least one updated learning output variable value for a learning data set of the at least one of the learning data sets from one or multiple further output variable value(s) to which the classifier maps the learning input variable values after a reset to an earlier training level with epoch E1<E2 such that an accuracy of the ascertained at least one updated learning output variable value is greater than the accuracy ascertained based on the training level with epoch E2,
wherein the learning input variable values are mapped by multiple modifications of the classifier, wherein the multiple modifications differ from one another to such an extent that they are not congruently merged into one another with advancing training of the classifier, to different output variable values, and
wherein a separate uncertainty is ascertained for each output variable value ascertained by each of the modifications, only an established number of the modifications which generated the output variable values having lowest uncertainties contributing to the ascertainment of the at least one updated learning output variable value;

operating the classifier by supplying input variable values to it, the input variable values encompassing measured data which were obtained by a physical measuring process, or by a partial or complete simulation of a physical measuring process, or by a partial or complete simulation of a technical system observable using a physical measuring process; forming an activation signal as a function of output variable values supplied by the classifier; and activating, using the activation signal, a vehicle or a system for the quality control of series-manufactured products, or a system for medical imaging.

13. A non-transitory machine-readable data carrier on which is stored a computer program for processing of learning data sets for a classifier, the learning data sets each encompassing measured data, which were obtained by a physical measuring process, or by a partial or complete simulation of a physical measuring process, or by a partial or complete simulation of a technical system observable using a physical measuring process, as learning input variable values, the learning data sets additionally each encompassing learning output variable values to which the classifier is to map the learning input variable values, the computer program, when executed by a computer, causing the computer to perform the following steps:

processing the learning input variable values of at least one of the learning data sets multiple times in a non-congruent manner by the classifier trained up to an epoch E2 so that the learning input variable values are mapped to different output variable values;

ascertaining a measure for an uncertainty of the output variable values from deviations of the output variable values;

in response to the uncertainty meeting a predefined criterion, ascertaining at least one updated learning output variable value for a learning data set of the at least one of the learning data sets from one or multiple further output variable value(s) to which the classifier maps the learning input variable values after a reset to an earlier training level with epoch $E1<E2$ such that an accuracy of the ascertained at least one updated learning output variable value is greater than the accuracy ascertained based on the training level with epoch E2;

wherein the learning input variable values are mapped by multiple modifications of the classifier, wherein the multiple modifications differ from one another to such an extent that they are not congruently merged into one another with advancing training, to different output variable values, and wherein a separate uncertainty is ascertained for each output variable value ascertained by each of the modifications, only an established number of the modifications which generated the output variable values having lowest uncertainties contributing to the ascertainment of the at least one updated learning output variable value.

14. A computer configured to process learning data sets for a classifier, the learning data sets each encompassing measured data, which were obtained by a physical measuring process, or by a partial or complete simulation of a physical measuring process, or by a partial or complete simulation of a technical system observable using a physical measuring process, as learning input variable values, the learning data sets additionally each encompassing learning output variable values to which the classifier is to map the learning input variable values, the computer configured to:

process the learning input variable values of at least one of the learning data sets multiple times in a non-congruent manner by the classifier trained up to an epoch E2 so that the learning input variable values are mapped to different output variable values;

ascertain a measure for an uncertainty of the output variable values from the deviations of the output variable values;

in response to the uncertainty meeting a predefined criterion, ascertain at least one updated learning output variable value for a learning data set of the at least one of the learning data sets from one or multiple further output variable value(s) to which the classifier maps the learning input variable values after a reset to an earlier training level with epoch $E1<E2$ such that an accuracy of the ascertained at least one updated learning output variable value is greater than the accuracy ascertained based on the training level with epoch E2;

wherein the learning input variable values are mapped by multiple modifications of the classifier, wherein the multiple modifications differ from one another to such an extent that they are not congruently merged into one another with advancing training, to different output variable values, and wherein a separate uncertainty is ascertained for each output variable value ascertained by each of the modifications, only an established number of the modifications which generated the output variable values having lowest uncertainties contributing to the ascertainment of the at least one updated learning output variable value.

* * * * *